United States Patent Office 3,830,798
Patented Aug. 20, 1974

3,830,798
HYDROLYSIS OF RIBONUCLEIC ACID CONTAINING MATERIAL
Bobby A. Herndon, Glendale, and Eugene L. Schneider, St. Louis County, Mo., assignors to Ralston Purina Company, St. Louis, Mo.
No Drawing. Original application Mar. 22, 1968, Ser. No. 715,149, now abandoned. Divided and this application June 18, 1970, Ser. No. 57,895
Int. Cl. C07d 51/50
U.S. Cl. 260—211.5 R                 10 Claims

ABSTRACT OF THE DISCLOSURE

Dog food compositions which exhibit enhanced flavor and acceptability when fed to dogs contain small amounts, on the order of 4 parts per million and up, of a ribonucleoside, such as adenosine, a 2',3'-ribonucleotide such such as 2',3'-uridylic acid, a poly-2',3'-ribonucleotide, a chemically hydrolyzed ribonucleic acid-containing material and/or certain other structurally related compounds such as uric acid, uracil, pyrimidine and purine, and salts and mixtures of such materials and the like. Enhancement of the flavor and acceptability of such dog food compositions may be further improved by including a glutamic acid salt, such as monosodium glutamate. The compositions may be stabilized against deteriorations of the enhanced flavor and acceptability by the addition of a stabilizing agent such as sodium tripolyphosphate or a salt of ethylenediaminetetraacetic acid. The flavor enhancing materials may be added to conventional dog rations in an aqueous medium at the time of feeding or may be sprayed onto or otherwise added to dog rations during processing thereof. Ribonucleic acid-containing materials, such as yeast materials, may be subjected to chemical hydrolysis at a pH above 12 and a temperature of 25–55° C. for periods of three or more hours to produce hydrolyzate materials useful for enhancing the flavor and acceptability of dog foods.

CROSS-REFERENCE TO RELATED APPLICATION

This application is a division of application Ser. No. 715,149, filed Mar. 22, 1968, now abandoned.

BACKGROUND OF THE INVENTION

The present invention lies in the field of dog food compositions and more particularly in the field of dog food compositions which display significantly enhanced flavor and acceptability characteristics when fed to dogs.

It is well established, on the basis of extensive investigation by the prior art, that 5'-nucleotides or 5'-ribonucleotides are useful for flavor enhancement of human foods. Thus, 5'-nucleotides such as 5'-guanylic acid, 5'-inosinic acid and their salts are potent flavor enhancers when incorporated into foods for humans. Certain 5'-nucleotides, such as sodium 5'-inosinate and sodium 5'-guanylate, in combination with monosodium glutamate, have also been found to enhance the magnitude of the chorda tympani response in rats to stimulation of the tongue.

It is, however, generally recognized by the art that 2'- and 3'-nucleotides, although isomers of the 5'-nucleotides, possess little or no flavor-enhancing properties. For example, Pat. No. 3,104,171, dated Sept. 17, 1963, states that purine and pyrimidine bases, their nucleosides, and their 2'- and 3'-nucleotides have little flavor while 5'-nucleotides have very agreeable good taste. A similar statement is found (page 1, col. 1, lines 44–50) in Pat. No. 3,355,- 301, dated Nov. 28, 1967. For this reason, the art has directed its efforts toward methods of preparing 5'-nucleotides which avoid formation of the unwanted 2'- and 3'-nucleotides. Thus, the use of chemical degradation or hydrolysis of ribonucleic acid materials has been avoided since the hydrolyzates or degradative products contain 2'- and 3'-nucleotides but not 5'-nucleotides.

Moreover, contrary to the effect observed in humans, it has been found that the addition of 5'-nucleotides to dog foods produces little or no enhancement of the flavor or acceptability of such foods when fed to dogs. There has remained, therefore, an unfulfilled need for materials which will impart a significantly enhanced flavor to dog foods and which can be employed on an economical basis in a manner comparable to the use of 5'-nucleotides in human foods.

SUMMARY OF THE INVENTION

Therefore, among the several objects of the present invention may be noted the provision of novel dog food compositions possessing improved flavor and acceptability; the provision of such dog food compositions which may be economically produced and which give consistently favorable results when fed to various species of dogs; the provision of methods of imparting significantly increased acceptance and palatability to dog foods by incorporating therein small amounts of certain flavor-enhancing materials; and the provision of novel methods of producing certain useful flavor-enhancing materials from readily available ribonucleic acid-containing materials. Other objects will be in part apparent and in part pointed out hereinafter.

The present invention is thus directed to an improved dog food composition possessing enhanced flavor and acceptability which comprises a dog ration and a flavor-enhancing agent from the group made up of ribonucleosides, 2',3' - ribonucleotides, poly-2',3'-ribonucleotides, purine, pyrimidine, ribonucleic acid, chemically hydrolyzed ribonucleic acid-containing materials, thymidine, xanthosine, hypoxanthine, xanthine, uric acid, cytosine, 5-methyl cytosine, uracil, thymine, orotic acid, adenine, guanine, ureidosuccinic acid, dihydro-DL-orotic acid, dihydrouracil, dihydrothymine, dihydro-6-methyl uracil, allantoin and salts and mixtures thereof. The invention further includes the method of imparting enhanced flavor and acceptability to dog foods by adding to a dog ration one or more of the above-designated materials. The invention also includes the novel method of chemically hydrolyzing a ribonucleic acid-containing material to produce a relatively bacteria-free material useful for imparting enhanced flavor and acceptablility to dog foods.

DESCRIPTION OF THE PREFERRED EMBODIMENTS

In accordance with the present invention, it has been unexpectedly found that 2',3'-nucleotides, poly - 2',3'- nucleotides, nucleosides, and certain other materials are effective to impart a significantly enhanced flavor or palatability to dog foods. In view of the experience of the prior art with such materials as discussed above, this finding is surprising and is apparently attributable to a biological specificity of such materials in dogs which differs from that observed in humans as regards the property of flavor enhancement. In any event, while the underlying mechanism is not fully understood, it has been demonstrated on the basis of actual test results involving the addition of such materials to dog rations fed to different species of dogs that a positive and definite preference for such rations over control rations is shown by the various groups of dogs tested.

It will be understood that the expression "2',3'-ribonucleotides" as employed herein includes 2'-ribonucleotides, 3'-ribonucleotides, 2',3' - ribonucleotides and salts and mixtures thereof and that the expression "poly - 2',3'- ribonucleotides" as employed herein includes polyribonucleotides in which the polymer chain terminates in a 2'- ribonucleotide, 3'-ribonucleotide or 2',3'-ribonucleotide unit, and salts and mixtures thereof. Exemplary of the 2', 3'-ribonucleotides which may be used in the practice of the invention are purine-based materials, such as 3'-adenylic acid, 3'-guanylic acid, 2',3' - adenylic acid, 2',3' - inosinic acid, 2' - xanthylic acid and pyrimidine-based materials such as 2',3' - cytidylic acid and 2',3' - uridylic acid. Other useful 2',3'-ribonucleotide compounds having a free phosphate or a phosphate salt radical in the 2'- 3'- or 2' and 3' positions of the ribose portion of the molecule are known to the art. Similarly useful in the present invention are poly - 2',3' - ribonucleotides which are polymers in which units of ribonucleotide molecules are joined together to form polymers of various chain lengths and which, as aforesaid, have a 2'-ribonucleotide, 3'-ribonucleotide or 2',3'-ribonucleotide unit at a terminal portion of the polymer chain. Since the separation of 2'-ribonucleotides from 3'-ribonucleotides and of 2'- and 3'-ribonucleotides from 2',3'-ribonucleotides and the separation of poly - 2',3' - ribonucleotides from each other is difficult, it is generally more convenient to use an admixture of such materials in pure or impure form in the practice of the invention. As described hereinafter, mixtures of 2'-, 3'- and 2',3'-ribonucleotides can be prepared in accordance with the invention by the chemical hydrolysis of ribonucleic acid-containing materials such as yeasts and the resulting hydrolyzates containing such mixtures can be directly utilized in carrying out the practice of the invention.

The useful ribonucleotides include adenosine, guanosine, cytidine and uridine or other purine or pyrimidine bases combined with ribose.

In addition, various other compounds have been found useful for flavor enhancement of dog foods in accordance with the invention. These include purine, pyrimidine, ribonucleic acid, thymidine, xanthosine, hypoxanthine, xanthine, uric acid, cytosine, 5-methyl cytosine, uracil, thymine, orotic acid, adenine, quanine ureidosuccinic acid, dihydro-DL-orotic acid, dihydrouracil, dihydrothymine, dihydro-6-methyl uracil, and allantoin.

Where salts of any of the foregoing compounds or materials are employed, it is generally preferred to use alkali metal salts such as sodium or potassium salts or alkaline earth salts such as calcium salts. The selection of the particular salt or salts used may in part be governed by the composition of the dog ration to which the flavor-enhancing compounds or materials of the invention are added and by the nutrititional requirements of the dogs being fed.

A practical and relatively inexpensive mode of preparing useful flavor-enhancing materials for employment in the practice of the invention involves the chemical hydrolysis of ribonucleic acid-containing materials. The expression "ribonucleic acid-containing materials" as used herein designates polymeric compounds or materials found in living tissues and including monomeric units consisting of purine or pyrimidine bases combined with ribose units. In the case of nucleotides and polynucleotides, the units include phosphate groups at the 2',3'- or 2'- and 3'-carbon positions whereas the nucleosides are phosphate-free. Useful ribonucleic acid-containing materials include such natural sources as yeast (e.g., dried brewer's yeast or torula yeast) and animal tissues. As is known in the art, the chemical hydrolysis of such materials with aqueous alkali produces a hydrolyzate containing a mixture of 2'- 3'- and/or 2',3' - ribonucleotides, and/or poly - 2',3' - ribonucleotides and/or ribonucleosides, the exact composition of the hydrolyzate being dependent upon the extent of hydrolysis (i.e., partial or complete), the conditions of hydrolysis and the nature of the starting material. In the prior art, chemical hydrolysis of ribonucleic acid-containing materials has generally been carried out at a pH below 12, for example, by employing 1.5–2.0 milliequivalent of alkaline material per gram of yeast starting material. The hydrolysis has also been carried out at room or elevated temperatures and for a sufficient length of time to give the desired degree of hydrolysis.

The prior art hydrolysis procedures may be utilized to produce useable hydrolyzates for accomplishing the purposes of the present invention. However, the conditions of alkaline hydrolysis previously employed have been found to contribute to an objectionable buildup of certain thermophilic bacteria. In accordance with the invention, we have found that a relatively bacteria-free hydrolyzate can be produced by carrying out the hydrolysis at a pH of at least 12 and maintaining the hydrolysis mixture at a pH in excess of 12. Since the pH normally decreases slightly (0.2–0.4) during the course of hydrolysis, it is preferred to operate at a pH in excess of 12.5 or 13. For example, using yeast as the ribonucleic acid-containing material, approximately 3.5 milliequivalent of an alkaline material, such as potassium hydroxide, per gram of yeast material has been found to produce the desired pH. With respect to temperature, the hydrolysis may be carried out at room temperatures (i.e., 15° C.-25° C.) or at elevated temperatures. Preferably, the hydrolysis is carried out at temperatures between approximately 25° C. and 55° C. The hydrolysis should be continued for at least three hours and, for the purposes of the present invention, is preferably conducted for a period of 12 to 24 hours. It will be understood that various alkaline materials known to the art, such as sodium hydroxide and potassium hydroxide, may be employed.

The hydrolyzates resulting from the above hydrolysis procedures are in the form of aqueous slurries or suspensions and may be used directly in the practice of the invention by being sprayed onto dog rations or otherwise added thereto. If desired, the hydrolyzates may be neutralized by the addition of an acid, such as acetic acid, phosphoric acid or hydrochloric acid, immediately prior to being applied to dog rations.

An important feature of the present invention is our finding that the addition of only small amounts of the flavor-enhancing agents of the invention is sufficient to impart a significant flavor-enhancing effect. Thus, in general, as little as 4 parts per million, based upon the dog ration, will impart a definite enhancement in flavor and acceptability. Preferably, between approximately 8 and 80 parts per million of the flavor-enhancing compound or material is added to the dog ration to obtain the desired flavor-enhancing effect. In using a hydrolyzate prepared as described above as the flavor-enhancing agent, we may employ between 0.2 and 2 grams (dry weight) per pound of dog ration, preferably 1 gram per pound of dog ration, to secure the desired degree of flavor enhancement. This is equivalent to approximately 80–100 parts per million parts of dog ration of the active ribonucleoside, 2',3'-ribonucleotide, polyribonucleotide and poly-2',3'-ribonucleotide flavor-enhancing materials contained in the hydrolyzate. It will be understood that the useful hydrolyzates described above contain a mixture of such polymeric and monomeric materials and salts thereof which, in admixture, produce a distinct flavor-enhancing effect.

The flavor, acceptability and/or palatability of the dog food compositions of the invention may be further enhanced by adding a glutamic acid salt to a dog ration in combination with one or more of the aforementioned flavor-enhancing agents. Monosodium glutamate is the preferred salt for use, but it will be understood that other salts such as the potassium and calcium salts may also be employed. In general, at least 20 parts per million parts of dog ration of such a glutamic acid salt should be used to a further enhancement of flavor.

It has further been found, in accordance with the invention that our novel dog food compositions may be stabilized against deterioration of the flavor-enhancing properties during storage of the compositions for extended periods of time by adding thereto small amounts of a stabilizing agent which functons to stabilize the phosphate bond in the ribonucleotide molecules or to stabilize the molecule as a whole or any part thereof. Among the stabilizing agents which may be used are sodium tripolyphosphate, orthophosphoric acid and salts of ethylenediaminetetraacetic acid.

The flavor-enhancing agents of the invention or mixtures thereof may be added to conventional dog rations, such as that sold under the trade designation "Purina Dog Chow" for example, by any means desired either during processing of the dog food or before or at the time of feeding the dog food. As an illustration, the dog food compositions of the invention may be conveniently formed by spraying the flavor-enhancing agent, carried in an aqueous medium, onto the dog ration or food during processing and prior to packaging thereof. Upon evaporation of the aqueous carrier, the agent is carried in a dry form by the dog ration particles and is distributed therethrough. The flavor-enhancing agents may also be added to the dog ration or food in the water used to moisten the food at the time of feeding. Further, the agents may be mixed with a dry carrier and dusted onto the the dog ration or food.

It will be understood that the flavor-enhancing materials of the invention may be added to conventional dog rations or foods of various types (e.g., dry and moist dog foods) and may be added alone or in combination with other foods, ingredients or additives to accomplish the objectives of the invention.

The following examples illustrate the invention.

In the experimental work described in the following examples, unless otherwise stated, the dog ration employed was that sold under the trade designation "Purina Dog Chow" by Ralston Purina Company. This product contains as ingredients meat and bone meal, wheat germ meal, ground oat groats, ground yellow corn, ground grain sorghums, wheat-middlings, ground wheat, soy bean meal, cereal food fines, dried whey, animal fat, vitamin $B_{12}$ supplement, artificial coloring, pyridoxine hydrochloride, riboflavin supplement, brewers' dried yeast, vitamin F supplement, D activated plant sterol, vitamin E supplement thiamin, niacin, iodized salt, manganese sulfate, manganous oxide, zinc oxide, iron oxide, copper oxide and cobalt carbonate. By analysis, the product contains not less than 23% crude protein and 8% crude fat, and not more than 4.5% crude fiber and 10% ash.

The dogs employed in the experimental work included poodles, redbone coonhounds, English setters, Labrador retrievers, springer spaniels, beagles, pointers and greyhounds. The dogs were randomized by groups, each containing 10 dogs, and there were 5 test dogs in each pen during the studies. The dogs were fed on an individual basis with the ration pans being rotated so that the same ration was not offered on the same side of the pen each day. The ration consumption of each dog was calculated and recorded for the test period indicated in the results set out below.

The statistical significance of the test results was determined by using the Wilcoxon's matched-pairs, signed-ranks test (American Statistical Association Journal, September 1965, pages 866–867).

In the tabulated results given in the tables below, the first figure under each ration column represents the total number of pounds of the ration which the group of dogs consumed, the dogs having equal access to both this ration and a second test or control ration, and the second figure (given in parentheses) represents the number of dogs which consumed more of the one ration in preference to the second ration. Where the second figure includes the fraction "½," this means that at least one dog showed equal preference for two rations.

EXAMPLE 1

The six materials set forth below were added in water to "Purina Dog Chow" at the time of feeding to determine whether the materials at the levels tested increase acceptability of the ration to the test dogs. The results are given in Table 1.

TABLE 1

| Amount of test material (fed wet—air-dry basis) | A (control), 0 p.p.m. | B, 8 p.p.m. | C, 80 p.p.m. | Significance |
|---|---|---|---|---|
| Test 1 (guanine): | | | | |
| Phase 1=15 dogs, 5 days | 31.6(3) | 46.1(12) | | P<.01 |
| Phase 2=15 dogs, 5 days | 22.0(0) | | 53.1(15) | P<.01 |
| Phase 3=15 dogs, 5 days | | 36.6(6½) | 37.0(6½) | N.S. |
| Test 2 (guanosine): | | | | |
| Phase 4=15 dogs, 5 days | 25.8(1½) | 47.3(13½) | | P<.01 |
| Phase 5=15 dogs, 5 days | 30.2(2½) | | 46.4(11½) | P<.01 |
| Phase 6=15 dogs, 5 days | | 27.6(4) | 43.1(11) | P<.01 |
| Test 3 (guanosine-3'-(2') phosphoric acid-sodium salt, hydrate): | | | | |
| Phase 7=15 dogs, 5 days | 20.1(2) | 41.7(13) | | P<.01 |
| Phase 8=15 dogs, 5 days | 22.0(2) | | 41.3(13) | P<.01 |
| Phase 9=15 dogs, 5 days | | 26.2(4) | 38.8(11) | P<.01 |
| Test 4 (inosine): | | | | |
| Phase 10=15 dogs, 5 days | 28.1(3) | 42.2(12) | | P<.03 |
| Phase 11=15 dogs, 5 days | 25.6(4) | | 39.7(11) | P<.02 |
| Phase 12=15 dogs, 5 days | | 28.1(2½) | 41.3(12½) | P<.01 |
| Test 5 (cytidine): | | | | |
| Phase 13=15 dogs, 5 days | 32.1(4) | 40.7(11) | | N.S. |
| Phase 14=15 dogs, 5 days | 20.9(½) | | 49.2(14½) | P<.01 |
| Phase 15=15 dogs, 5 days | | 30.3(6) | 33.1(9) | N.S. |
| Test 6 (uridine): | | | | |
| Phase 16=15 dogs, 5 days | 27.2(4) | 44.2(11) | | P<.01 |
| Phase 17=15 dogs, 5 days | 20.9(2) | | 44.8(13) | P<.01 |
| Phase 18=15 dogs, 5 days | | 23.7(4) | 43.5(9) | N.S. |

The results show that each of the six materials increased acceptability at both the 8 and 80 p.p.m. levels as compared with the control ration.

EXAMPLE 2

Example 1 was repeated with six additional materials as test materials using six pens of rotated dogs. The results are given in Table 2.

TABLE 2

| Amount of test material (fed wet—air-dry basis) | Ration number A (control), 0 p.p.m. | B, 8 p.p.m. | C, 80 p.p.m. | Significance |
|---|---|---|---|---|
| Test 1 (guanine): | | | | |
| Phase 1=15 dogs, 5 days | 34.6(2) | 53.6(13) | | P<.01 |
| Phase 2=15 dogs, 5 days | 42.9(10) | | 42.3(5) | N.S. |
| Phase 3=15 dogs, 5 days | | 38.2(5) | 49.7(10) | P<.10 |
| Test 2 (guanosine): | | | | |
| Phase 4=15 dogs, 5 days | 32.4(2½) | 57.0(12½) | | P<.001 |
| Phase 5=15 dogs, 5 days | 33.3(2) | | 60.7(13) | P<.005 |
| Phase 6=15 dogs, 5 days | | 30.4(4) | 51.0(11) | P<.02 |
| Test 3 (guanosine-3'-(2') phosphoric acid, sodium salt, hydrate): | | | | |
| Phase 7=15 dogs, 5 days | 36.8(4) | 50.3(11) | | P<.04 |
| Phase 8=15 dogs, 5 days | 31.3(3) | | 59.0(12) | P<.005 |
| Phase 9=15 dogs, 5 days | | 48.3(10) | 45.1(5) | N.S. |
| Test 4 (inosine): | | | | |
| Phase 10=15 dogs, 5 days | 34.4(4) | 55.3(11) | | P<.03 |
| Phase 11=15 dogs, 5 days | 33.0(1½) | | 66.4(13½) | P<.005 |
| Phase 12=15 dogs, 5 days | | 43.5(5) | 52.5(10) | N.S. |
| Test 5 (mixed isomers of 2'-cytidylic acid and 3'-cytidylic acid): | | | | |
| Phase 13=15 dogs, 5 days | 35.2(4) | 53.3(11) | | P<.05 |
| Phase 14=15 dogs, 5 days | 30.3(2) | | 63.9(13) | P<.005 |
| Phase 15=15 dogs, 5 days | | 42.6(7½) | 51.0(7½) | N.S. |
| Test 6 (2',3'-uridylic acid): | | | | |
| Phase 16=15 dogs, 5 days | 31.9(3) | 49.6(12) | | P<.05 |
| Phase 17=15 dogs, 5 days | 27.0(1½) | | 59.5(13½) | P<.001 |
| Phase 18=15 dogs, 5 days | | 44.5(4) | 53.1(11) | N.S. |

The results show that the six materials effectively increased acceptability of the test rations compared with the control ration.

The results of the following test show that the combination of guanosine and monosodium glutamate produced greater acceptability than guanosine alone.

EXAMPLE 3

Examples 1 and 2 were repeated using guanosine alone and a mixture of guanosine and monosodium glutamate as the test materials. The guanosine used was obtained from two different sources of supply. The results are given in Table 3.

TABLE 3

| Ration number | | 1 | 2 | 3 | 4 | 5 | 6 | 7 |
|---|---|---|---|---|---|---|---|---|
| Ration, "Purina Dog Chow" containing: | | | | | | | | |
| Guanosine, p.p.m. | | 0 | 4 | 8 | 0 | 4 | 8 | 0 |
| Monosodium glutamate, p.p.m. | | | | | | | | 0 |
| Feed consumption—fed wet (air-dry basis) | | | | | | | | |
| Phase | No. dogs | No. days | | | | | | |
| 1 | 15 | 5 | 51.4(5) | 59.6(10) | | | | |
| 2 | 15 | 5 | 40.1(6½) | | 45.8(8½) | | | |
| 3 | 15 | 5 | | 52.4(2½) | 67.1(12½) | | | |
| 4 | 15 | 5 | | | | 40.7(6) | 44.4(9) | |
| 5 | 15 | 5 | | | | 35.7(3½) | | 60.4(11½) |
| 6 | 15 | 5 | | | | | 32.6(2) | 49.2(8) |
| 7 | 15 | 5 | | | | | | | 32.9(2) |
| 8 | 15 | 5 | | | | | | | 37.7(6) |
| 9 | 15 | 5 | | | | | | | |
| 10 | 15 | 5 | | | | | | | |
| 11 | 15 | 5 | | | | | | | |
| 12 | 15 | 5 | | | | | | | |

| Ration number | | 8 | 9 | 10 | 11 | 12 | Significance |
|---|---|---|---|---|---|---|---|
| Ration, "Purina Dog Chow" containing: | | | | | | | |
| Guanosine, p.p.m. | | 4 | 8 | 0 | 4 | 8 | |
| Monosodium glutamate, p.p.m. | | 20 | 40 | 0 | 20 | 40 | |
| Feed consumption—fed wet (air-dry basis) | | | | | | | |
| Phase | No. dogs | No. days | | | | | |
| 1 | 15 | 5 | | | | | | N.S. |
| 2 | 15 | 5 | | | | | | N.S. |
| 3 | 15 | 5 | | | | | | P<.01 |
| 4 | 15 | 5 | | | | | | N.S. |
| 5 | 15 | 5 | | | | | | P<.02 |
| 6 | 15 | 5 | | | | | | N.S. |
| 7 | 15 | 5 | 58.3(13) | | | | | P<.001 |
| 8 | 15 | 5 | | 52.1(9) | | | | N.S. |
| 9 | 15 | 5 | 38.2(2) | 60.0(13) | | | | P<.005 |
| 10 | 15 | 5 | | | 22.5(3) | 51.8(12) | 56.6(14) | P<.01 |
| 11 | 15 | 5 | | | 23.3(1) | | | P<.001 |
| 12 | 15 | 5 | | | | 37.3(7½) | 41.7(7½) | N.S. |

EXAMPLE 4

The effect of adding ribonucleic acid and hydrolyzed ribonucleic acid, respectively, in solution to "Purina Dog Chow" at the time of feeding to groups of test dogs was determined. The results are given in Table 4.

TABLE 4

| Ration number | 1 (control) | 2 | 3 | Significance |
|---|---|---|---|---|
| Percent "Purina Dog Chow" | 100 | 100 | 100 | |
| RNA, p.p.m. | | 8 | | |
| Hydrolyzed RNA, p.p.m. | | | 8 | |
| Food consumption fed wet (air-dry basis): | | | | |
| Phase 1=30 dogs, 5 days | 49.8(0) | 103.7(30) | | P<.001 |
| Phase 2=30 dogs, 5 days | 55.1(5½) | | 89.0(24½) | P<.001 |
| Phase 3=30 dogs, 5 days | | 65.5(10) | 87.0(20) | P<.03 |

The results show that both materials were effective in increasing acceptability.

EXAMPLE 5

The effect on the acceptability of dog rations of guanosine and a combination of guanylic acid, uridylic acid, cytidylic acid and adenylic acid added in solution to "Purina Dog Chow" at the time of feeding was determined. The results are set forth in Table 5.

TABLE 5

| Ration number | 1 (control) | 2 | 3 | Significance |
|---|---|---|---|---|
| Percent "Purina Dog Chow" | 100 | 100 | 100 | |
| Guanosine | | 8 | | |
| 2',3'-guanylic acid, p.p.m. | | | 2 | |
| 2',2'-uridylic acid, p.p.m. | | | 2 | |
| 2',3'-cytidylic acid, p.p.m. | | | 2 | |
| 2',3'-adenylic acid, p.p.m. | | | 2 | |
| Food consumption—fed wet (air-dry basis): | | | | |
| Phase 1=15 dogs, 5 days | 30.7(2) | 50.9(13) | | P<.005 |
| Phase 2=15 dogs, 5 days | 26.7(3) | | 61.1(12) | P<.005 |
| Phase 3=15 dogs, 5 days | | 25.4(2) | 50.3(13) | P<.001 |

The results show that the combination of the four named materials improved acceptability to a greater degree than guanosine alone.

EXAMPLE 6

The effect of various materials on the acceptability of dog rations was determined. The materials were added in water to the dog rations at the time of feeding. Each test group consisted of 10 dogs and the test period or phase in each instance was 5 days. The results are given in Table 6.

TABLE 6

| | Food consumption of— | | |
|---|---|---|---|
| Test material | Control, "Purina Dog Chow" | Test material (10 p.p.m.) plus "Purina Dog Chow" | Significance |
| Purine | 24.5(2) | 42.2(7½) | P<.10 |
| Purine riboside | 22.4(0) | 47.7(10) | P<.005 |
| Pyrimidine | 17.6(0) | 29.4(10) | P<.005 |
| Cytidine | 15.3(0) | 30.3(10) | P<.005 |
| Thymidine | 29.5(2) | 40.1(8) | P<.01 |
| Uridine | 22.6(1) | 47.1(9) | P<.02 |
| Xanthosine | 23.2(2) | 39.1(8) | P<.02 |
| 2',-3'-cyclic phosphate of uridylic acid | 14.1(1) | 33.1(9) | P<.01 |
| Hypoxanthine | 23.2(1½) | 41.2(8½) | P<.01 |
| Xanthine | 27.5(2) | 39.7(8) | P<.10 |
| Uric acid | 10.7(0) | 26.2(10) | P<.005 |
| Cytosine | 18.5(1) | 28.9(9) | P<.005 |
| 5-methyl cytosine | 19.4(1) | 36.8(9) | P<.01 |
| Uracil | 18.2(1) | 43.3(9) | P<.01 |

The results show that each of the materials tested improved acceptability of the ration when added at a level of 10 p.p.m.

EXAMPLE 7

The effect of brewer's dried yeast and hydrolyzed brewer's dried yeast on the acceptability of dog rations was determined. The materials were added in the water used to moisten the rations at the time of feeding. The results are given in Table 7. The "placebo" below was soy meal.

TABLE 7

| Ration number | 1 (control) | 2 | 3 | Significance |
|---|---|---|---|---|
| "Purina Dog Chow," grams | 452.67 | 452.67 | 452.67 | |
| Control ("placebo"), grams | 1.0 | | | |
| Brewer's dried yeast, grams | | 1.0 | | |
| Hydrolyzed Brewer's dried yeast, grams | | | 1.0 | |
| Feed consumption—fed wet (air-dry basis): | | | | |
| Phase 1=30 dogs, 5 days | 58.3 | 83.4(24) | | P<.0001 |
| Phase 2=30 dogs, 5 days | 65.0(8) | | 89.8(22) | P<.005 |
| Phase 3=30 dogs, 5 days | | 47.6(4½) | 107.0(25½) | P<.0001 |

The results show that both materials increased acceptability of the action and that the hydrolyzed yeast material rendered the ration significantly more acceptable than did the non-hydrolyzed yeast material.

EXAMPLE 8

The effect of hydrolyzed brewer's yeast at two different levels on the acceptability of dog rations was determined. The yeast material was sprayed on "Purina Dog Chow" before feeding the test dogs. The results are given in Table 8.

TABLE 8

| Ration number | 1 | 2 | 3 | Significance |
|---|---|---|---|---|
| Percent "Purina Dog Chow" | 100 | 100 | 100 | |
| Hydrolyzed brewer's yeast, gram/lb | 0 | 0.2 | 1.0 | |
| Feed consumption—fed wet (air-dry basis): | | | | |
| Phase 1=30 dogs, 5 days | 65.9(3) | 116.5(27) | | P<.0001 |
| Phase 2=30 dogs, 5 days | | 75.3(3½) | 110.2(26½) | P<.001 |
| Phase 3=30 dogs, 5 days | 62.0(4½) | | 119.6(25½) | P<.0001 |

The results show that the yeast material significantly improved acceptability of the dog ration both at 0.2 gms./lb. (440 p.p.m.) and at 1 gm./lb. (2,200 p.p.m.).

EXAMPLE 9

The effect of non-hydrolyzed and hydrolyzed brewer's yeast and torula yeast, respectively, on the acceptability of dog rations was determined. The materials in the form of aqueous media was sprayed onto the "Purina Dog Chow" ration prior to feeding. The results are set forth in Table 9.

TABLE 9

| Ration number | 1 | 2 | 3 | 4 | 5 | 6 | Significance |
|---|---|---|---|---|---|---|---|
| Percent of— | | | | | | | |
| Dog chow | 100 | 100 | 100 | 100 | 100 | 100 | |
| Control 1 (water) | | | | | | | |
| Control 2 (water) | | | | | | | |
| Non-hydrolyzed brewer's yeast | .25 | | | | | | |
| Hydrolyzed brewer's yeast | | .25 | | | | | |
| Non-hydrolyzed torula yeast | | | | | .25 | | |
| Hydrolyzed torula yeast | | | | | | .25 | |
| Feed consumption—fed wet (air-dry basis): | | | | | | | |
| Phase 1=30 dogs, 5 days | 27.45(5½) | 67.6(24½) | | | | | P<.0001 |
| Phase 2=30 dogs, 5 days | 28.1(2) | | 85.7(28) | | | | P<.0001 |
| Phase 3=30 dogs, 5 days | | 31.0(4) | 71.1(26) | | | | P<.0001 |
| Phase 4=30 dogs, 5 days | | | | 48.9(6½) | 77.6(23½) | | P<.01 |
| Phase 5=30 dogs, 5 days | | | | 52.0(8) | | 64.8(22) | P<.02 |
| Phase 6=30 dogs, 5 days | | | | | 46.8(5) | 71.7(25) | P<.0001 |

The results show that the two types of yeast, in both the non-hydrolyzed and hydrolyzed form, significantly improve acceptability and that the hydrolyzed yeast materials render the ration significantly more acceptable than do the non-hydrolyzed materials.

EXAMPLE 10

The effect of a period of three months storage on the acceptability of stabilized and unstabilized brewer's yeast materials was determined. The materials were sprayed onto the "Purina Dog Chow" rations prior to feeding. The results are given in Table 10.

TABLE 10

| Ration number | 1 | 2 | 3 | Significance |
|---|---|---|---|---|
| Percent "Purina Dog Chow" | 100 | 100 | 100 | |
| Unstabilized hydrolyzed brewer's yeast, ml./lb. "Dog Chow" | 7 | | | |
| Hydrolyzed brewer's yeast stabilized with sodium tripolyphosphate and orthophosphoric acid, ml./lb. "Dog Chow" | | 7 | | |
| Hydrolyzed yeast stabilized with sodium salts or ethylenediamine, tetraacetic acid and HCl, ml./lb. "Dog Chow" | | | 7 | |
| Feed consumption—fed wet (air-dry basis): | | | | |
| Phase 1=30 dogs, 5 days | 53.9(3) | 93.0(27) | | P<.0001 |
| Phase 2=30 dogs, 5 days | 65.8(10) | | 84.6(10) | P<.05 |
| Phase 3=30 dogs, 5 days | | 63.9(9) | 87.7(21) | P<.02 |

The results show that the unstabilized material is inferior, as regards enhanced acceptability, to both of the stabilized materials.

EXAMPLE 11

The effect of hydrolyzation time and temperature on the acceptability of hydrolyzed brewer's yeast materials was determined. The various hydrolyzed materials were sprayed onto the "Purina Dog Chow" rations prior to feeding. The results are given in Table 11.

TABLE 11

| Ration number | 1 | 2 | 3 | 4 | 5 | 6 | Significance |
|---|---|---|---|---|---|---|---|
| Percent "Purina Dog Chow" | 100 | 100 | 100 | 100 | 100 | 100 | |
| Brewer's yeast (1 g./lb. "Dog Chow"), hydrolyzed at— | | | | | | | |
| Temp., °C | 25 | 25 | 25 | 35 | 35 | 35 | |
| No. hours processed | 3 | 8 | 15 | 3 | 8 | 15 | |
| Feed consumption—fed wet (air-dry basis): | | | | | | | |
| Phase 1=30 dogs, 5 days | 90.3(11½) | 102.2(18½) | | | | | N.S. |
| Phase 2=30 dogs, 5 days | 80.7(10) | | 104.5(20) | | | | P<.04 |
| Phase 3=30 dogs, 5 days | | 70.1(5) | 113.4(25) | | | | P<.0001 |
| Phase 4=30 dogs, 5 days | | | | 59.2(10) | 84.9(20) | | P<.01 |
| Phase 5=30 dogs, 5 days | | | | | 53.1(3) | 101.4(27) | P<.0001 |
| Phase 6=30 dogs, 5 days | | | | 55.4(3½) | | 103.9(26½) | P<.0001 |
| Phase 7=20 dogs, 5 days | 33.9(6½) | | | 62.1(13½) | | | P<.01 |
| Phase 8=20 dogs, 5 days | | 46.0(7) | | | 66.8(13) | | P<.10 |
| Phase 9=20 dogs, 5 days | | | 47.5(3½) | | | 64.3(16½) | P<.005 |

The results show that products resulting from hydrolysis at 35° C. are more effective than those resulting from hydrolysis at 25° C. and that hydrolysis for fifteen hours at either temperature produces a more effective product than hydrolysis for shorter periods of time.

EXAMPLE 12

Commercial ribonucleic acid (10 g.) was added with mixing to 0.3N potassium hydroxide (200 ml.) until a clear light brown solution was obtained. This solution was incubated at 37° C. for a period of eighteen hours and then neutralized to a pH of about 8 with concentrated hydrochloric acid. The final volume was adjusted to 250 ml. with water. Using the same quantity of ribonucleic acid and neutralized potassium hydroxide as above (plus a small amount of additional potassium hydroxide to aid solution), a solution of non-hydrolyzed ribonucleic acid was prepared, as well as a blank containing neutralized potassium hydroxide only. These preparations were the preparations employed in the tests described in Example 4 with the results given in Table 4 being obtained.

EXAMPLE 13

Dry brewer's yeast (700 g.) was slurried with 0.3N sodium hydroxide (4000 ml.) in a Waring Blender. The solution was incubated for a period of twenty-two hours at 37° C. and neutralized with concentrated hydrochloric acid. Water was added to bring the total volume to 5200 ml. A suspension of brewer's yeast (700 g.) in neutralized sodium hydroxide (4000 ml.) was prepared and diluted to 5200 ml. to serve as a control and a similar solution containing no yeast was prepared to serve as a blank. These materials were the materials employed in the tests described in Example 7 with the results given in Table 7 being obtained.

EXAMPLE 14

Each of three portions (600 g.) of dry brewer's yeast was slurried with water (2000 ml.). To this was added 9.2N potassium hydroxide (98 ml.) and water (900 ml.). After mixing, each suspension was incubated at 37° C. for eighteen hours and then neutralized to a pH of about 7 with concentrated hydrochloric acid. To one resulting hydrolyzate was added sodium tripolyphosphate (273 g.) plus enough phosphoric acid to bring the pH to about 7. To a second hydrolyzate was added disodium ethylenediaminetetraacetate (41 g.). Nothing was added to the third hydrolyzate. Water was added to bring the volume of each preparation to 4200 ml. These preparations were the preparations employed in the tests described in Example 10 with the results given in Table 10 being obtained.

EXAMPLE 15

Dry brewer's yeast (770 g.) was slurried in water with the aid of a blender. To this was added 9.15N potassium hydroxide (130 ml.) and enough water to bring the total volume to 3900 ml. After eighteen hours incubation at 37° C., the resulting hydrolyzate was neutralized with concentrated hydrochloric acid (70 ml.), and diluted to 5400 ml. One sample of the hydrolyzate (800 ml.) was diluted by the addition of water (3200 ml.) and marked as supplement A. A second sample consisting of 4000 ml. of the hydrolyzate solution was marked as supplement B. A third sample consisting of 4000 ml. of water was marked as supplement C. These samples were the ones employed in the tests described in Example 8 with the results given in Table 8 being obtained.

EXAMPLE 16

Example 11 was repeated except that the hydrolysis conditions were varied as follows:

| Ration No. | Conditions at— | |
|---|---|---|
| | Time | Temperature,° C. |
| 1 | 16 | 37 |
| 2 | 27 | 37 |
| 3 | 40 | 37 |
| 4 | 9 | 55 |
| 5 | 16 | 55 |
| 6 | 27 | 55 |

The results of feeding the hydrolyzates produced to dogs showed that the products resulting from hydrolysis at the higher temperature and for longer periods of time tended to provide greater acceptability.

EXAMPLE 17

Dry brewer's yeast (17.5 lb.) was added to water (97.5 lb.), and the mixture slurried to an even consistency. To this was added potassium hydroxide (3.95 lb.) dissolved in water (4.0 lb.). This produced a concentration of 3.5 meq. potassium hydroxide per gram of yeast. After a period of eighteen to forty-two hours at room temperature, portions of the slurry were removed, neutralized with concentrated hydrochloric acid and sprayed onto "Purina Dog Chow." Upon being fed to dogs, it was found that rations containing the thus produced hydrolyzate produced greater acceptability than did control rations.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. The method of chemically hydrolyzing a ribonucleic acid-containing material comprising the steps of mixing, in an aqueous medium, a ribonucleic acid-containing material with a sufficient quantity of an alkaline material to produce a pH of at least 12 and maintaining the resulting mixture at said pH and a temperature at least equivalent to room temperature for a period of at least three hours.

2. The method of chemically hydrolying a ribonucleic acid-containing material as set forth in claim 1 wherein said temperature is between approximately 25° C. and 55° C.

3. The method of chemically hydrolyzing a ribonucleic acid-containing material as set forth in claim 1 wherein said period is between approximately 12 and 24 hours.

4. The method of chemically hydrolyzing a ribonucleic acid-containing material as set forth in claim 1 wherein said pH is approximately 12.5–13.

5. The method of chemically hydrolyzing a ribonucleic acid-containing material as set forth in claim 1 wherein the ribonucleic acid-containing material is yeast and the quantity of alkaline material is 3.5 milliequivalent of alkaline material per gram of yeast.

6. The method of chemically hydrolyzing a ribonucleic acid-containing material comprising the steps of mixing, in an aqueous medium, a ribonucleic acid-containing material with a sufficient quantity of an alkaline material to produce a pH of at least 12 and maintaining the resulting mixture at said pH and a temperature at least equivalent to room temperature for a period of at least three hours thereby producing a hydrolyzate containing a mixture of materials selected from the group consisting of 2'-ribonucleotides, 3'-ribonucleotides, 2',3'-ribonucleotides, poly-2',3'-ribonucleotides and ribonucleosides.

7. The method of chemically hydrolyzing a ribonucleic acid-containing material as set forth in claim 6 wherein said temperature is between approximately 25° C. and 55° C.

8. The method of chemically hydrolyzing a ribonucleic acid-containing material as set forth in claim 6 wherein said period is between approximately 12 and 24 hours.

9. The method of chemically hydrolyzing a ribonucleic acid-containing material as set forth in claim 6 wherein said pH is approximately 12.5–13.

10. The method of chemically hydrolyzing a ribonucleic acid-containing material as set forth in claim 6 wherein the ribonucleic acid-containing material is yeast and the quantity of alkaline material is 3.5 milliequivalent of alkaline material per gram of yeast.

References Cited

UNITED STATES PATENTS

| | | | |
|---|---|---|---|
| 3,382,231 | 5/1968 | Hirahara et al. | 260—211.5 R |
| 3,337,530 | 8/1967 | Hanze | 260—211.5 R |
| 3,338,881 | 8/1967 | Wiley | 260—211.5 R |
| 3,457,254 | 7/1969 | Yano et al. | 260—211.5 R |

JOHNNIE R. BROWN, Primary Examiner

U.S. Cl. X.R.

426—1, 175